(12) United States Patent
Hoppe (10) Patent No.: US 8,258,656 B2
(45) Date of Patent: Sep. 4, 2012

(54) COVER FOR A SECONDARY PART OF A LINEAR MOTOR

(75) Inventor: Thomas Hoppe, Lemgo (DE)

(73) Assignee: Siemens Aktiengesellschaft, Munich (DE)

( * ) Notice: Subject to any disclaimer, the term of this patent is extended or adjusted under 35 U.S.C. 154(b) by 343 days.

(21) Appl. No.: 12/532,915

(22) PCT Filed: Mar. 25, 2008

(86) PCT No.: PCT/EP2008/053465
§ 371 (c)(1),
(2), (4) Date: Sep. 24, 2009

(87) PCT Pub. No.: WO2008/116857
PCT Pub. Date: Oct. 2, 2008

(65) Prior Publication Data
US 2010/0109449 A1    May 6, 2010

(30) Foreign Application Priority Data
Mar. 26, 2007 (DE) .......................... 10 2007 014 396

(51) Int. Cl.
*H02K 41/02* (2006.01)
*H02K 41/03* (2006.01)

(52) U.S. Cl. ............... 310/12.05; 310/12.01; 310/12.04; 310/12.31; 310/12.27; 310/24; 310/36

(58) Field of Classification Search ............... 310/12.16, 310/12.17, 12.33, 12.01, 12.02, 23, 24, 34, 310/36; *H02K 41/02, 41/03*
See application file for complete search history.

(56) References Cited

U.S. PATENT DOCUMENTS

| | | | | |
|---|---|---|---|---|
| 4,661,730 A * | 4/1987 | Maruyama et al. | ........ | 310/12.17 |
| 5,169,054 A * | 12/1992 | Matsui et al. | .................. | 228/136 |
| 5,179,304 A * | 1/1993 | Kenjo et al. | .................. | 310/12.27 |
| 6,545,375 B2 | 4/2003 | Hollis, Jr. | | |
| 7,205,687 B2 * | 4/2007 | Wavre et al. | ...................... | 310/58 |
| 7,851,951 B2 * | 12/2010 | Hoppe et al. | ................ | 310/12.01 |
| 2008/0136268 A1 * | 6/2008 | Lachat et al. | .................... | 310/12 |
| 2008/0246350 A1 * | 10/2008 | Hoppe et al. | ...................... | 310/12 |

FOREIGN PATENT DOCUMENTS

| | | |
|---|---|---|
| DE | 197 02 348 A1 | 7/1998 |
| DE | 198 17 090 A1 | 10/1999 |

(Continued)

OTHER PUBLICATIONS

Machine translation of JP2002176762, Ishii et al., Jun. 2002.*

(Continued)

*Primary Examiner* — Quyen Leung
*Assistant Examiner* — Terrance Kenerly
(74) *Attorney, Agent, or Firm* — Henry M. Feiereisen, LLC (57) ABSTRACT

The invention relates to a cover (20) for a secondary part (2) of an electrical linear motor (1), wherein the secondary part (2) includes at least one first and one second secondary partial element (12), and wherein each secondary partial element (12) comprises a toothed profile, and wherein the cover (20) extends over the toothed profiles of the first and second secondary partial elements (12), forming a continuous surface. The invention further relates to a secondary part (2) comprising a cover (20) and a linear motor (1) comprising a secondary part (2) and a cover (20).

31 Claims, 3 Drawing Sheets

FOREIGN PATENT DOCUMENTS

| | | |
|---|---|---|
| DE | 198 53 250 A1 | 5/2000 |
| DE | 199 12 136 C2 | 2/2001 |
| DE | 10 2004 145 992 A1 | 4/2006 |
| DE | 10 2006 028 461 A1 | 2/2007 |
| EP | 1 655 824 A1 | 5/2006 |
| JP | 05168218 * | 7/1993 |
| JP | 2002176762 * | 6/2002 |
| WO | WO 2006/032255 A1 | 3/2006 |

OTHER PUBLICATIONS

Machine translation of JP05168218, Umehara, Jul. 1993.*

* cited by examiner

COVER FOR A SECONDARY PART OF A LINEAR MOTOR

CROSS-REFERENCES TO RELATED APPLICATIONS

This application is the U.S. National Stage of International Application No. PCT/EP2008/053465, filed Mar. 25, 2008, which designated the United States and has been published as International Publication No. WO 2008/116857 and which claims the priority of German Patent Application, Serial No. 10 2007 014 396.8, filed Mar. 26, 2007, pursuant to 35 U.S.C. 119(a)-(d).

BACKGROUND OF THE INVENTION

The invention relates to a cover for a secondary part of an electrical linear motor, wherein the secondary part comprises at least one first and one second secondary part element, and wherein each secondary part element has a toothed profile. The invention also relates to a secondary part having a cover, and to a linear motor having a secondary part and a cover.

Electrical machines have a primary part and a secondary part. By way of example, the secondary part is a rotor of a rotary electrical machine or else a moving part of a linear motor. By way of example, the primary part is a stator or a stationary part with a single-phase or polyphase winding. In the case of linear motors, both the primary part and the secondary part may be moving parts.

In general, stators and rotors for electrical machines have a laminated core, comprising individual electrical laminates, wherein the winding or else permanent magnets for generation of magnetic fields is or are arranged on the laminated core. The individual laminates for stators and rotors are generally stamped individually and are joined together to form laminated cores, for example by stamping and packeting, welding or bracketing.

In order to guide the main magnetic flux between a stator and a rotor, toothed laminates are normally used in stators/rotors that are fitted with windings. The winding is arranged in the slots in the laminates and the laminated core. After the insulation of the slots, the winding is introduced, for example by drawing it in.

DE 10 2004 045 992 A1 discloses an electrical machine whose secondary part has no active means, such as windings through which a current can be passed or permanent magnets, for producing a magnetic field. In the case of a permanent-magnet synchronous linear motor with a secondary part without any permanent magnets, the primary part has windings through which a current can be passed and has permanent magnets, wherein the secondary part has only a toothed structure composed of a material which contains iron.

WO 2006/032255 A1 discloses a secondary part for an electrical linear motor, wherein the secondary part has no active means for generation of magnetic fields. Various embodiments are specified for a passive secondary part such as this.

Linear motors such as these are used in various fields of engineering as drives, in particular direct drives, for example for machine tools, processing machines such as automatic drilling, milling, turning, placement or bonding machines.

The physical length of the movement path depends on the purpose of the linear motor, and must be at least as long as the required movement distance plus the length of the rotor. In order to be flexible for the design of linear motors of different length, the secondary parts are, for example, formed from relatively short secondary part elements, which are arranged in a row to form the desired length.

The butt joints which are used in this case are, however, disadvantageous, particularly in severe operating conditions, in that dust, operating liquids, aggressive substances, etc. can accumulate in them. It is also impossible to prevent dirt and operating liquids, solid parts, tool pieces, etc. being deposited on the movement path. These foreign objects then, in particular, enter the air gap in the linear motor, thus enormously adversely affecting the life of the linear motor. Particularly in the case of movement paths which are arranged horizontally, it is impossible to prevent accumulation of dirt. Even if there is little dirt, it is only a question of time as to when the linear motor will fail.

SUMMARY OF THE INVENTION

The object of the present invention is to provide a cover which protects a secondary part, which is free of active means for generation of magnetic fields, in particular in the air gap, reliably against foreign objects, which adversely affect the operation. Further objects are to provide a secondary part having a protective cover, as well as a linear motor having a secondary part such as this.

This object is achieved according to the invention by a secondary part for a linear motor having at least two secondary part elements, wherein each secondary part element has a toothed profile. The toothed profiles face the air gap and a primary part of the linear motor. Each secondary part element is preferably formed by means of a laminated core which has a plurality of laminates, in particular electrical laminates. However, a secondary part element may also be unlaminated, for example in the form of a solid toothed rod.

The toothed profile can be formed by having various profile shapes, that is to say geometries. Examples of geometries are a rectangular shape, a triangular shape or a sinusoidal shape, etc.

According to the invention, a cover extends as one part or a plurality of parts over the toothed profiles of at least two secondary part elements, and forms a continuous surface.

In a first embodiment, the cover extends in the form of a plurality of parts over the toothed profiles of the at least two secondary part elements, that is to say each secondary part element has a separate cover, wherein the individual secondary part element covers overall produce one cover, and form a continuous surface.

The secondary part has a first and a second secondary part element, which are arranged in a row in a movement direction of the primary part, wherein one secondary part element in each case has one cover. This has the advantage that each secondary part element can be manufactured completely with its own cover. After the secondary part elements have been arranged and assembled to form a secondary part, the covers are connected to one another.

By way of example, one cover of one secondary part element is formed by means of a cured encapsulation compound. Encapsulation compounds such as these are, for example, casting resins. An encapsulation compound is advantageous since this has no adverse affect on the functionality of the linear motor. Furthermore, the toothed profile is covered completely, in particular in such a way that no dirt can accumulate in corners of the slots.

A further possibility is for one cover of one secondary part element to be formed by means of a corresponding laminate section. The secondary part element is formed by means of a laminated core, wherein a plurality of individual laminates are joined together to form the laminated core. The individual laminates are generally stamped individually and are then joined together to form laminated cores by means of stamping and packaging, welding or bracketing. In this case, it is now possible to design the laminate section for the individual laminates such that this results in a cover after the laminates have been joined together. Each individual laminate is stamped out so as to produce a narrow cover for each laminate. This solution is cost-effective, since the laminates must be stamped in any case, and the original for the laminate section need be adapted only once. However, this solution has magnetic disadvantages, since this impedes the guidance of the magnetic fluxes from the primary part to the secondary part. In addition, it is possible for dirt to accumulate in the slots, since they are partially exposed.

In addition, one cover for one secondary part element may be in the form of a flat covering plate and may be arranged on, that is to say attached to, the toothed profile of the secondary part. A flat covering plate such as this preferably has a small thickness in the region of tenths of a millimeter, for example 0.3 mm or 0.4 mm, as a result of which there is no adverse affect on the operation, in particular the guidance of the magnetic fields. By way of example, a covering plate such as this is produced from plastic.

In the embodied variants with regard to a cover which is formed from a plurality of parts or a plurality of pieces, butt joints and minimal intermediate spaces necessarily result, however, when the individual secondary part elements are arranged with their individual covers in a row. These intermediate spaces are advantageously filled by means of a filling material, wherein the covers can be connected to one another at the same time. By way of example, one such filling material is any suitable plastic, for example silicone. The filling material can connect not only the covers but also the secondary parts to one another. The filling material can be applied to one side of a secondary part element even during manufacture, and then fills the butt joint when the secondary part elements are arranged in a row. However, the filling material can just as well be introduced between the individual butt joints only during assembly of the individual secondary part elements to form a secondary part, for example by being sprayed in (silicone).

In a second embodiment, the cover is in the form of an integral covering plate and extends integrally over the toothed profiles, that is to say one integral cover extends over all the secondary part elements that have been arranged in a row, and forms a continuous surface.

The cover, which is in the form of a covering plate, can advantageously be attached by means of connecting elements to the toothed profiles of the individual secondary part elements. By way of example, holding elements or holding apparatuses are arranged or formed on the teeth of the toothed profiles, and the covering plate can be clipped, pushed or hooked into them.

In a further refinement, the secondary part elements each have a cured encapsulation compound, wherein the covering plate can then be attached to the encapsulation. The encapsulation compound itself provides a continuous surface in the form of a cover for the individual secondary part elements, wherein the covering plate is then placed over the encapsulated toothed profiles. The covering plate has holding elements, for example clips or barbs, which are pressed into the encapsulation compound. This on the one hand creates a continuous cover, while on the other hand fixing the secondary part elements and partially connecting them to one another. In particular, the holding elements are arranged at a predeterminable distance apart from one another on the side of the covering plate which faces the toothed profiles and, in particular, the holding elements are pressed in the area of the butt joints, thus connecting and fixing the secondary part elements.

It is also possible to encapsulate the individual secondary part elements and to provide the cured encapsulation with a slot in each case on two opposite sides, and to plug or insert the covering plate into the slots. The slots may be arranged both on the sides parallel to a movement direction and the sides transversely with respect to a movement direction of the primary part. By way of example, the covering plate has attachments by means of which the covering plate is pushed into the slots. Surprisingly, it has been found that a cover according to the invention of the secondary part does not adversely affect the operation of the linear motor, and provides adequate protection against dirt and foreign objects. Furthermore, a choice can be made between the individual variants of the cover depending on the field of use of the linear motor. It is also possible to retrofit a cover to linear motors which are already in use, without major effort. If it becomes dirty or worn, a detachably attached cover can also be replaced.

The linear motor according to the invention is preferably in the form of a synchronous machine, wherein the secondary part is the stationary component, and the primary part is the moving component. The secondary part has no active means for production of magnetic fields while, in contrast, the primary part has at least two active means for production of magnetic fields, in particular in the form of windings through which a current can be passed, and permanent magnets.

The physical length of the movement path, that is to say of the secondary part, depends on the purpose of the linear motor, and it must be at least as long as the required movement distance plus the length of the rotor (primary part). In order to be flexible for the design of linear motors of different lengths, the secondary parts are formed from relatively short secondary part elements, which are arranged in a row to form the desired length. In this case, any desired number of secondary part elements can be arranged in a row in any desired direction. The secondary part elements can be arranged in a row both in a movement direction of the primary part and transversely with respect to the movement direction of the primary part. The cover according to the invention forms a continuous surface, at least over two secondary part elements. However, the cover may extend over any desired number of secondary part elements, wherein different embodiments of cover can be combined with one another.

BRIEF DESCRIPTION OF THE DRAWING

Further features and details of the invention will be explained in more detail in the following description on the basis of exemplary embodiments and in conjunction with the attached drawings. In this case, features and relationships which are described in individual variants can in principle be transferred to all the exemplary embodiments. In the drawings.

DETAILED DESCRIPTION OF PREFERRED EMBODIMENTS

Figure 1:
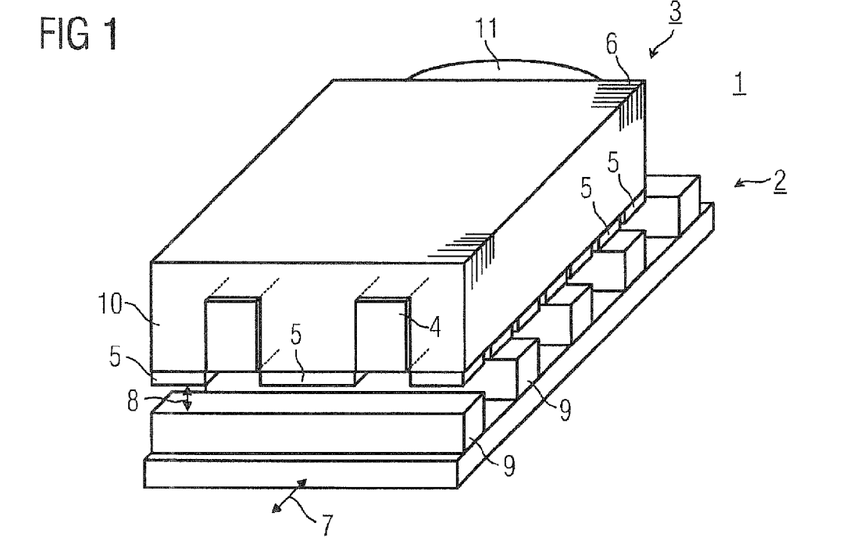
FIG. 1 shows an outline illustration of a linear motor with a toothed secondary part.

FIG. 1 shows an outline illustration of a linear motor 1 having a toothed secondary part 2 and having a primary part 3. The primary part 3 has a winding 4, permanent magnets 5 and a laminated core 6. The movement direction of the primary part 3 is indicated by means of a double-headed arrow 7, which runs in the longitudinal direction of the linear motor 1. The laminated primary part 3 has the permanent magnets 5 on the side facing the secondary part 2. The permanent magnets 5 are fitted such that their magnetization alternates. The permanent magnets 5 produce a magnetic flux whose alignment alternates transversely with respect to an air gap 8. The winding 4 surrounds the winding teeth 10, with the winding 4 forming an end winding 11. The air gap 8 between the primary part 3 and the secondary part 2 forms an air gap plane, wherein the secondary part 2 has teeth 9 which are adjacent to the air gap 8. The winding 4 of the primary part 3 is a first active means for production of a first magnetic field, and the permanent magnets 5 are a second active means for production of a second magnetic field. The secondary part 2 has no active means for production of magnetic fields.

Figure 2:
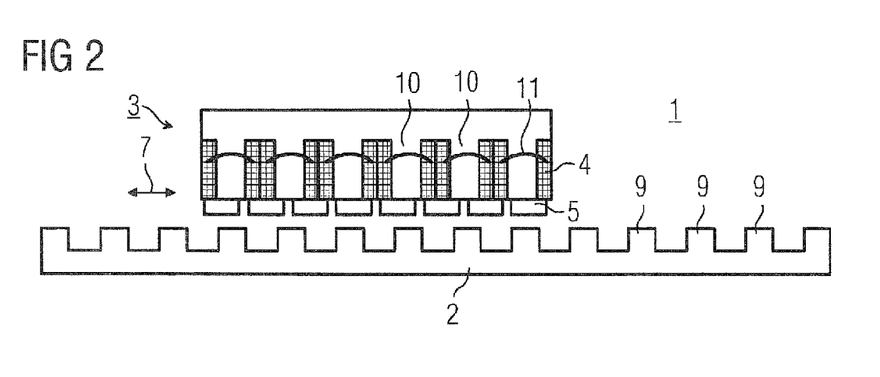
FIG. 2 shows a cross-sectional view of the linear motor shown in FIG. 1.

FIG. 2 shows a cross-sectional view of the linear motor 1 shown in FIG. 1. The cross-sectional plane runs parallel to or along the movement direction 7 of the primary part 3. The secondary part 2 is formed from one part and has the teeth 9. The primary part 3 has the winding 4 as well as the permanent magnets 5, wherein the winding 4 surrounds winding teeth 10. End windings 11 are illustrated symbolically by curves. The secondary part 2 is laminated, wherein a large number of individual electrical laminates are layered and joined together parallel to the movement direction 7.

Figure 3:
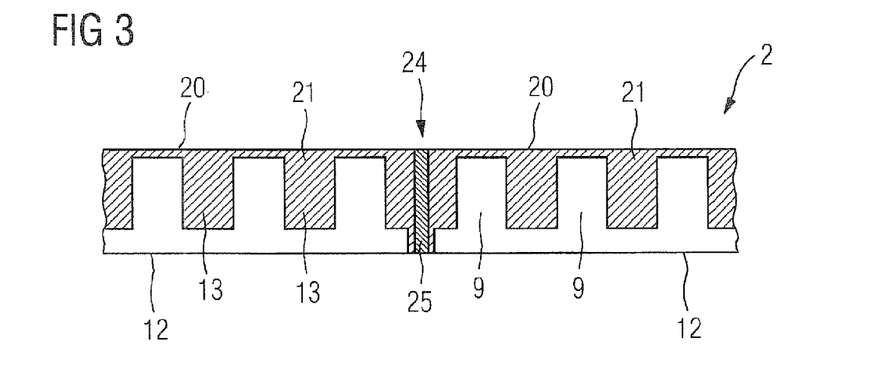
FIG. 3 shows a secondary part with a cover, which is formed by means of an encapsulation compound.

FIG. 3 shows a secondary part 2 with a cover 20 which is formed by means of cured encapsulation compounds 21. The secondary part 2 has a first and a second secondary part element 12, which are arranged in a row in the movement direction 7 of the primary part 3 (see FIG. 2), wherein one secondary part element 12 in each case has one cover 20. Each secondary part element 12 has a toothed profile which is formed by the teeth 9 and slots 13.

After the secondary part elements 12 have been arranged to form an entire secondary part 2, the covers 20 are connected to one another. According to this embodiment, the cover 20 is formed from a plurality of pieces or a plurality of parts and extends over the toothed profiles of the secondary part elements 12, that is to say a plurality of partial covers result overall in one cover 20, and form a continuous surface.

One cover 20 of one secondary part element 12 is formed by means of a cured encapsulation compound 21. Encapsulation compounds 21 such as these are, for example, casting resins. The toothed profile is covered completely, as a result of which no dirt can accumulate, in particular in corners of the slots 13.

Figure 4:
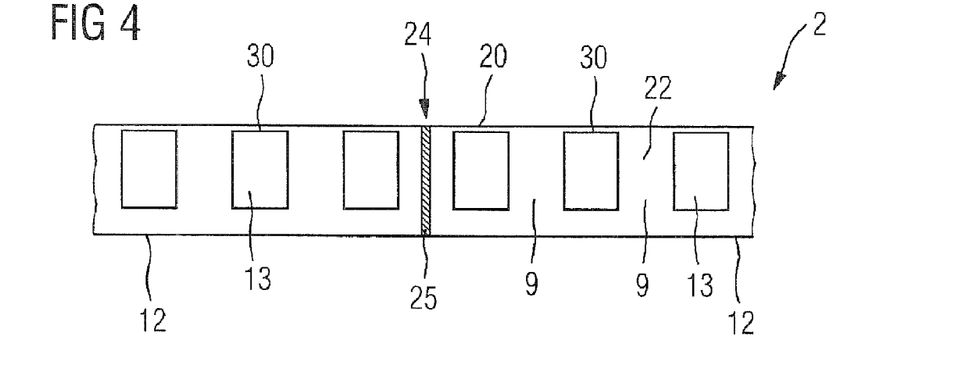
FIG. 4 shows a secondary part with a cover, which is formed by means of a laminate section.

FIG. 4 shows a secondary part 2 with a cover 20 which is formed by means of a laminate section 22. The secondary part elements 12 are each formed by means of a laminated core, wherein a plurality of individual laminates are joined together to form the laminated core. The individual laminates are generally stamped individually and are then assembled by stamping and packaging, welding or bracketing to form laminated cores. It is now possible in this case to design the laminate section 22 for the individual laminates so as to create a cover 20 when the laminates have been joined together. The laminate section 22 may, for example, be designed such that the teeth 9 are each connected to one another by means of a web 30. In this case, the slots 13 have a rectangular cross section. However, the slots 13 may also have a different cross section, corresponding to the configuration of a web 30, for example being oval, rounded, semicircular or circular.

Figure 5:
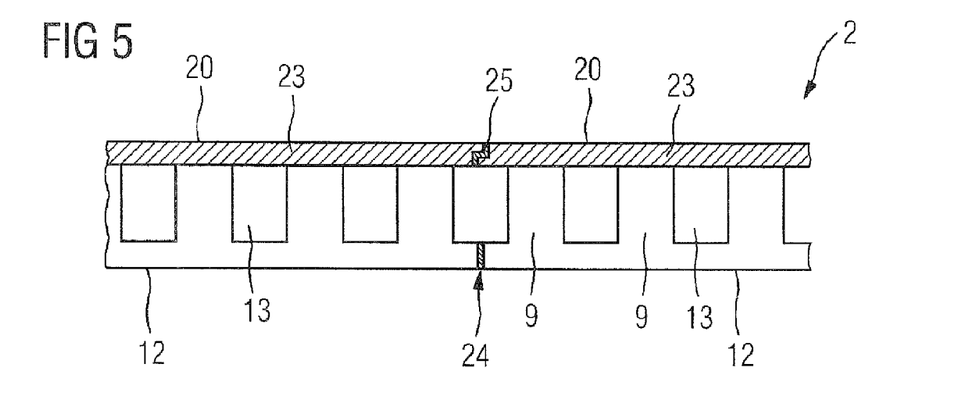
FIG. 5 shows a secondary part with a cover, which is in the form of a covering plate having a plurality of parts.

FIG. 5 shows a secondary part 2 having a cover 20 which is in the form of a covering plate 23 comprising a plurality of parts. The covering plate 23 is attached or fixed to the toothed profile of the secondary part 2. The covering plate 23 is as thin as possible, with a thickness in the tenths of millimeter range, as a result of which there is no adverse affect on operation, and in particular on the guidance of the magnetic fields. A covering plate 23 such as this is produced, for example, from plastic and is adhesively bonded to the teeth 9 of the secondary part elements 12.

In the refinements shown in FIG. 3, FIG. 4 and FIG. 5, the cover 20 is in each case formed from a plurality of pieces or a plurality of parts. When the secondary part elements 12 are joined together, this necessarily results in butt joints with minimal intermediate spaces 24. These intermediate spaces 24 are filled by means of a filling material 25, with the covers 20 being connected to one another at the same time. By way of example, a filling material 25 such as this is any suitable plastic, for example silicone. In addition to the covers 20, the filling material 25 can also connect the secondary part elements 12 to one another. The filling material 25 may be applied to one side of a secondary part element 12 even during manufacture, and then fills the intermediate space 24 of a butt joint when the secondary part elements 12 are arranged in a row. However, the filling material 25 can just as well be introduced between the individual intermediate spaces 24 during assembly of the individual secondary part elements 12 to form a secondary part 2, for example by being sprayed in.

Figure 6:
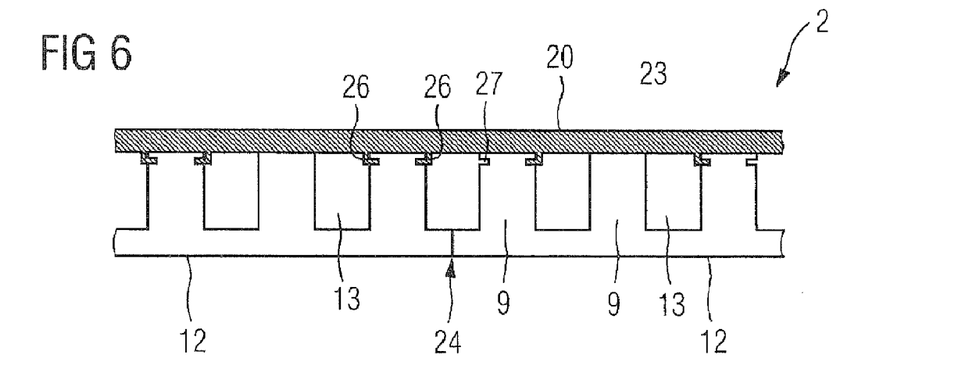
FIG. 6 shows a secondary part having a cover, which is formed from one part and is attached to toothed profiles.

FIG. 6 shows a secondary part 2 with a cover 20 which is formed integrally or from one part, and is attached to the teeth 9. The cover 20, which is in the form of a covering plate, is attached by means of connecting elements 26 to a predeterminable number of teeth 9 of the secondary part elements 12. By way of example, holding elements 27 such as slots are arranged or formed on the teeth 9, and the cover 20 is clipped, pushed or hooked onto them. As shown in FIG. 6, the teeth 9 do not all have holding elements 27. It is possible to provide any desired number of teeth 9 with holding elements 27, for example corresponding to the purpose of the secondary part 2. FIG. 6 also shows that the number of holding elements 27 is not equal to the number of connecting elements 26. In the present case, there are fewer connecting elements 26 than holding elements 27. For example, all the teeth 9 could be provided with holding elements 27, although corresponding connecting elements 26 engage only in selected holding elements 27.

The cover 20 is in the form of a flat covering plate and extends integrally over the secondary part elements 12, forming a continuous surface. In this case as well, the cover 20 is as thin as possible, with a thickness in the tenths of millimeter range, as a result of which there is no adverse affect on operation, and in particular on the guidance of the magnetic fields.

Figure 7:
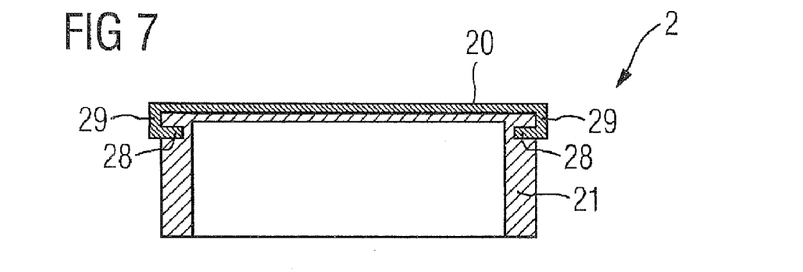
FIG. 7 shows a secondary part having a cover, which is formed from one part and is pushed into slots in encapsulation.

FIG. 7 shows a secondary part 2 with a cover 20 which is formed integrally and is pushed into slots 28 in encapsulation 21. The secondary part 2 is illustrated from an end face, that is to say from a face transversely with respect to the movement direction 7 (see FIG. 2). The individual secondary part elements 12 (which are arranged one behind the other in this illustration, that is to say on the plane of the drawing) are encapsulated, wherein the cured encapsulation 21 is in each case provided with a slot 28 on two opposite sides, and the covering plate 20 is pushed into and fixed in the slots 28 from one end face. The slots 28 may be arranged both on the sides parallel to the movement direction 7 (as illustrated in FIG. 7) and on the sides transversely with respect to the movement direction 7 of the primary part 3 (not shown). By way of example, the covering plate 20 has attachments 29, by means of which the covering plate 20 is pushed into the slots 28.

Figure 8:
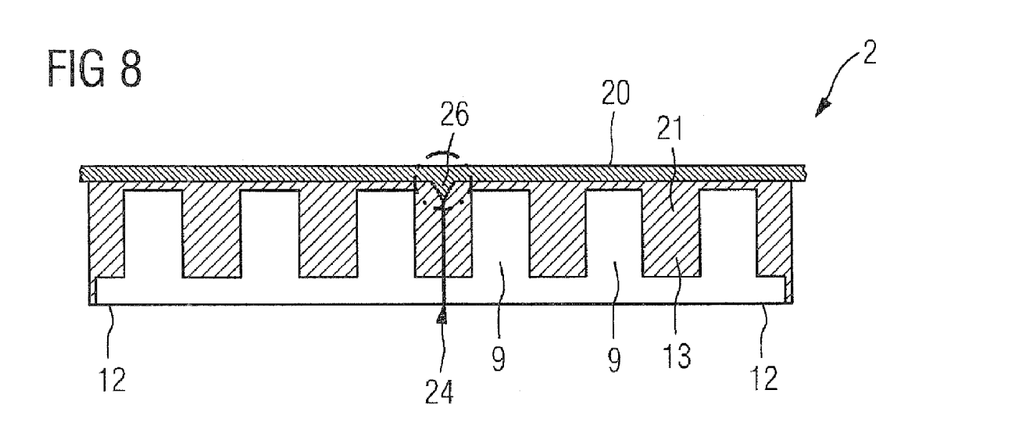
FIG. 8 shows a secondary part having a cover, which is formed from one part and is attached to the encapsulation.

FIG. 8 shows a secondary part 2 with a cover 20 which is formed integrally and is attached to the cured encapsulation 21. The secondary part elements 12 each have encapsulation 21, wherein the cover 20 is then attached to the encapsulation 21. The encapsulation compounds 21 themselves from a continuous surface, in the form of a cover for the individual secondary part elements 12, with the cover 20, which is in the form of a covering plate, then being placed over the encapsulated toothed profiles. The covering plate has connecting elements 26, such as clips or barbs, which are pressed into the encapsulation compound 21. In consequence, a continuous cover 20 is created on the one hand, while the secondary part elements 12 are fixed and partially connected to one another, on the other hand. In particular, the holding elements 26 are arranged at a predeterminable distance apart on the side of the cover 20 facing the toothed profiles, and in particular the holding areas 26 are pressed in the area of the butt joints 24, as a result of which the secondary part elements 12 are connected and fixed.

Figure 9:
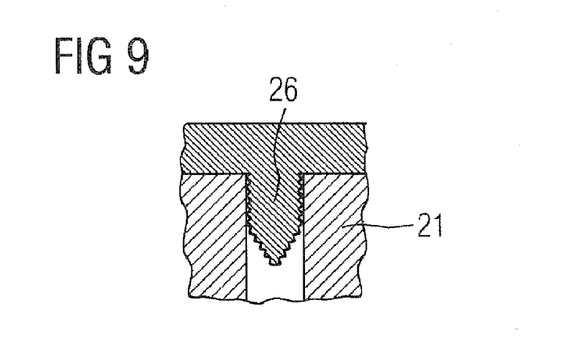
FIG. 9 shows a detailed view of the attachment shown in FIG. 8.

FIG. 9 shows a detailed view of a holding element 26 as shown in FIG. 8. As can be seen, the holding element 26 is in the form of a pin or plug, wherein the holding element 26 has a friction-increasing structure or a barb structure, such that the holding element 26 can be pressed in one direction, specifically into the encapsulation compound 21, and is then hooked in the encapsulation compound 21, producing a nondetachable connection.

What is claimed is:

1. A cover for a secondary part of an electrical linear motor, said secondary part comprising first and second secondary part elements abutting each other in a movement direction of a primary part of the linear motor, each first and second secondary part element having a toothed profile facing an air gap disposed between the secondary part and the primary part, wherein the cover extends over the toothed profiles of the first and second secondary part elements in the air gap and forms a continuous surface facing the primary part, wherein the cover is constructed in the form of a single-piece covering plate, and further comprising connecting elements for attaching the covering plate to the toothed profiles of the first and second secondary part elements.

2. The cover of claim 1, wherein one of the first and second secondary part elements is constructed in the form of a laminated core having a plurality of laminates, wherein the laminates are arranged in parallel relationship to a movement direction of a primary part of the linear motor.

3. The cover of claim 1, wherein the cover is formed from a plurality of parts.

4. The cover of claim 3, wherein the first secondary part element has a first cover, and the second secondary part element has a second cover to the first cover.

5. The cover of claim 4, wherein one of the first and second covers is formed by a cured encapsulation compound.

6. The cover of claim 4, wherein one of the first and second secondary part elements is constructed in the form of a laminated core having a plurality of laminates, wherein one of the first and second covers is formed by a corresponding laminate section of the laminates of the laminated core of the one secondary part element.

7. The cover of claim 4, wherein one of the first and second covers is formed by a flat covering plate and is fixed to the toothed profile of the secondary part.

8. The cover of claim 4, wherein the first and second covers are connected to one another by a filling material.

9. The cover of claim 8, wherein the filling material includes plastic.

10. A cover for a secondary part of an electrical linear motor, said secondary part comprising first and second secondary part elements abutting each other in a movement direction of a primary part of the linear motor, each first and second secondary part element having a toothed profile facing an air gap disposed between the secondary part and the primary part, wherein the cover extends over the toothed profiles of the first and second secondary part elements in the air gap and forms a continuous surface facing the primary part, said cover being constructed in the form of a single-piece covering plate, wherein each of the first and second secondary part elements has a cured encapsulation compound, said covering plate being constructed for attachment to the cured encapsulation compound, and further comprising connecting elements for attaching the covering plate to the toothed profiles of the first and second secondary part elements, wherein the connecting elements are arranged at a predeterminable distance apart on the cover such that the connecting elements are affixed to the encapsulation compound in an area of butt joints between the first and second secondary part elements.

11. The cover of claim 10, wherein the cured encapsulation compound has two opposite sides, each provided with a slot, said covering plate being insertable into the slots.

12. A secondary part of an electrical linear motor, comprising:
   at least two secondary part elements abutting each other in a movement direction of a primary part of the electrical motor, each secondary part element having a toothed profile facing an air gap disposed between the secondary part and the primary part; and
   a cover constructed to extend over the toothed profiles of the two secondary part elements in the air gap and to form a continuous surface facing the primary part, wherein the toothed profile comprises holding elements and the cover comprises connecting elements constructed for engagement with the holding elements to secure the cover to the toothed profiles of the secondary part elements.

13. The secondary part of claim 12, wherein the cover is a single-piece construction.

14. The secondary part of claim 12, wherein the cover is comprised of several parts.

15. The secondary part of claim 14, wherein the parts of the covers are connected to one another by a filling material.

16. The secondary part of claim 12, wherein the cover is formed by a cured encapsulation compound.

17. The secondary part of claim 12, wherein the cover is constructed in the form of a flat covering plate and fixed to the toothed profile of the secondary part elements.

18. The secondary part of claim 12, wherein the filling material includes plastic.

19. A secondary part of an electrical linear motor, comprising:
- at least two secondary part elements abutting each other in a movement direction of a primary part of the electrical motor, each secondary part element having a toothed profile facing an air gap disposed between the secondary part and the primary part, wherein each of the secondary part elements has a cured encapsulation compound;
- a cover constructed to extend over the toothed profiles of the two secondary part elements in the air gap and to form a continuous surface facing the primary part, said cover being constructed for attachment to the cured encapsulation compound; and
- connecting elements for attaching the cover to the toothed profiles of the secondary part elements, wherein the connecting elements are arranged at a predeterminable distance apart on the cover such that the connecting elements are affixed to the encapsulation compound in an area of butt joints between the first and second secondary part elements.

20. The secondary part of claim 19, wherein the cured encapsulation compound has two opposite sides, each provided with a slot, said cover being insertable into the slots.

21. A linear motor, comprising:
- a movable primary part,
- a secondary part interacting with the primary part and including at least two secondary part elements abutting each other in a movement direction of the primary part of the linear motor, each first and second secondary part element having a toothed profile facing an air gap disposed between the secondary part and the primary part;
- a cover extending as one part or a plurality of parts over the toothed profiles of the two secondary part elements in the air gap and forming a continuous surface facing the primary part, said cover being constructed in the form of a single-piece covering plate; and
- connecting elements for attaching the covering plate to the toothed profiles of the first and second secondary part elements.

22. The linear motor of claim 21, wherein one of the first and second secondary part elements is constructed in the form of a laminated core having a plurality of laminates, wherein the laminates are arranged in parallel relationship to a movement direction of the primary part of the linear motor.

23. The linear motor of claim 21, wherein one of the secondary part elements has a first cover, and the other one of the second secondary part elements has a second cover, said first and second covers being connected to one another.

24. The linear motor of claim 23, wherein one of the first and second covers is formed by a cured encapsulation compound.

25. The linear motor of claim 23, wherein one of the secondary part elements is constructed in the form of a laminated core having a plurality of laminates, wherein one of the first and second covers is formed by a corresponding laminate section of the laminates of the laminated core of the one secondary part element.

26. The linear motor of claim 23, wherein one of the first and second covers is formed by a flat covering plate and is fixed to the toothed profile of the secondary part elements.

27. The linear motor of claim 23, wherein the first and second covers are connected to one another by a filling material.

28. The linear motor of claim 27, wherein the filling material includes plastic.

29. The linear motor of claim 21, wherein the secondary part defines a movement path for the primary part.

30. A linear motor, comprising:
- a movable primary part,
- a secondary part interacting with the primary part and including at least two secondary part elements abutting each other in a movement direction of the primary part of the linear motor, each first and second secondary part element having a toothed profile facing an air gap disposed between the secondary part and the primary part;
- a cover extending as one part or a plurality of parts over the toothed profiles of the two secondary part elements in the air gap and forming a continuous surface facing the primary part, said cover being constructed in the form of a single-piece covering plate, wherein each of the secondary part elements has a cured encapsulation compound, said covering plate being constructed for attachment to the cured encapsulation compound; and
- connecting elements for attaching the cover to the toothed profiles of the secondary part elements, wherein the connecting elements are arranged at a predeterminable distance apart on the cover such that the connecting elements are affixed to the encapsulation compound in an area of butt joints between the secondary part elements.

31. The linear motor of claim 30, wherein the cured encapsulation compound has two opposite sides, each provided with a slot, said covering plate being insertable into the slots.

* * * * *

UNITED STATES PATENT AND TRADEMARK OFFICE
CERTIFICATE OF CORRECTION

PATENT NO. : 8,258,656 B2  Page 1 of 1
APPLICATION NO. : 12/532915
DATED : September 4, 2012
INVENTOR(S) : Thomas Hoppe It is certified that error appears in the above-identified patent and that said Letters Patent is hereby corrected as shown below:

FOREIGN PATENT DOCUMENTS, page 2: 3rd German patent document: Change DE 10 2004 145 992 to --DE 10 2004 045 992--.

Signed and Sealed this
Thirteenth Day of November, 2012

David J. Kappos
*Director of the United States Patent and Trademark Office*